United States Patent

Carlson

[11] 3,777,180
[45] Dec. 4, 1973

[54] SIGNAL-SEQUENCE CONTROL CIRCUIT
[75] Inventor: Paul A. Carlson, New Providence, N.J.
[73] Assignee: Wagner Electric Corporation, Newark, N.J.
[22] Filed: Apr. 27, 1972
[21] Appl. No.: 248,113

[52] U.S. Cl.............. 307/216, 307/231, 307/232, 340/52 E
[51] Int. Cl.... H03k 19/08, H03k 19/32, B60q 9/00
[58] Field of Search.............. 340/223, 52 E, 278; 317/139, 140, 134; 307/231, 232, 216

[56] References Cited
UNITED STATES PATENTS
3,662,227  5/1972  Morrison ............................ 307/232
3,721,833  3/1973  Kramer ............................... 307/232
3,723,760  3/1973  Ebrahimi ........................ 307/216 X Primary Examiner—John W. Huckert
Assistant Examiner—William D. Larkins
Attorney—William D. Lucas

[57] ABSTRACT

A circuit for receiving two signals indicating occupancy of an automobile seat and fastening of the associated seat belt, and operative to generate an output signal in response to either (1) the presence of only one signal or the other, or (2) the occurrence of both signals in an improper sequence.

10 Claims, 1 Drawing Figure

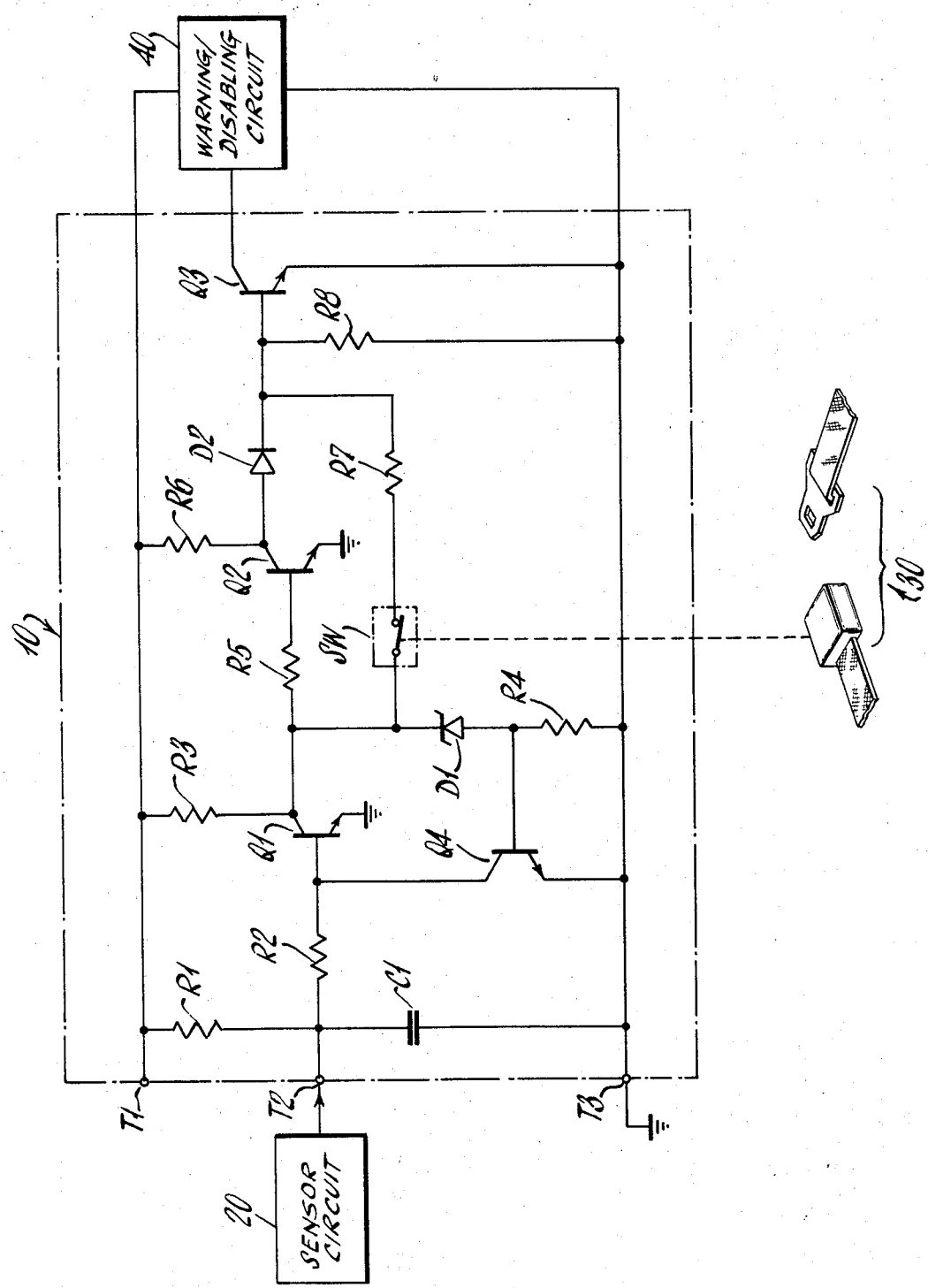

SIGNAL-SEQUENCE CONTROL CIRCUIT

CROSS-REFERENCES TO RELATED APPLICATIONS

The present invention may be advantageously employed in combination with sensor circuits of the type disclosed in copending application Ser. No. 263,182 entitled CAPACITANCE-RESPONSIVE CONTROL CIRCUIT filed on June 15, 1972, in the name of Carl E. Atkins and in copending application Ser. No. 280,219 entitled CAPACITANCE-RESPONSIVE CONTROL CIRCUIT filed on Aug. 14, 1972 in the name of Carl E. Atkins, and with warning circuits of the type disclosed in copending application Ser. No. 255,155 entitled ELECTRONIC TIMING CIRCUITS filed on May 19, 1972 in the name of Paul A. Carlson.

BACKGROUND OF THE INVENTION

As a safety feature, it has been found to be desirable to include in automotive vehicles a system for detecting both proper and improper usage of seat belts and for providing visual and/or audible warning signals in response to improper use. Such systems may also disable the automobile by either preventing engine start-up or preventing the car from being put into gear. Such systems may employ a variety of sensor circuits to provide signals indicative of (1) occupancy of a particular seat and (2) the condition of the buckle of the seat belt associated with that particular seat. The purpose of the present invention is to receive and process those signals indicating seat occupancy and condition, and to provide an output signal in response to seat occupancy without the seat buckle being fastened and vice-versa, or the seat buckle being fastened followed by seat occupancy. The output signal thus generated may be employed to control, inter alia, a warning circuit, or a disabling circuit, or both.

SUMMARY OF THE INVENTION

The present invention is embodied in and carried out by a circuit which is operative to receive first and second signals indicative of two separate conditions, and to provide a predetermined output signal in response to either (1) the presence of only one signal or the other, or (2) the occurrence of both signals in an improper sequence.

BRIEF DESCRIPTION OF THE DRAWING

The present invention may be better understood if the written description thereof is read with reference to the accompanying drawing, which is a schematic circuit diagram of the preferred embodiment of the present invention, showing its relationship to other elements of a system.

DETAILED DESCRIPTION OF THE PEFERRED EMBODIMENT

Referring now to the drawing, the circuit 10 which embodies the present invention is adapted to receive two signals. In the earlier-mentioned automotive application, the first signal is in the form of an output voltage from a sensor circuit 20, the output of which is normally constantly low or oscillating between high and low voltages when the associated seat is unoccupied, but becomes either constantly high or floats in response to seat occupancy. The second signal is provided by switch SW, which is normally closed, but is opened when the associated seat belt buckle 30 is fastened. Basically, this circuit willl energize the warning/disabling circuit 40 under each of the following sequences:

1. Seat occupied, seat belt buckle unfastened;
2. Seat occupied, seat belt buckle fastened and then unfastened;
3. Seat belt buckle fastened, without seat occupancy;
4. Seat belt buckle fastened, then seat occupied.

In operation, terminal T1 is connected to a source of DC power having a nominal output of about +10 volts, and terminal T3 is grounded. The initial circuit conditions are that (1) the voltage at signal input terminal T2 is either constantly low or alternately low and high when the seat associated with the sensor circuit 20 is unoccupied, and (2) switch SW is normally closed when the associated seat belt buckle is unfastened. Transistor Q1 is non-conductive, and its collector is therefore at a positive voltage determined by the divider formed by resistances R3, R7 and R8 paralleled by the base-emitter junction of transistor Q3. Transistor Q2 is consequently conductive, so that its collector is at a low voltage. Transistor Q3 is also normally conductive to disable the warning/disabling circuit 40. Due to the isolating effect of diode D2, the low voltage at the collector of Q2 does not cause Q3 to become non-conductive; rather, Q3 is maintained conductive by the high voltage derived at the collector of Q1 and applied through switch SW and resistor R7 to the base of Q3. Transistor Q4, whose base voltage is derived at the junction of zener diode D1 and resistance R4, is normally non-conductive since the voltage at the collector of Q1 is normally too low to cause D1 to break down and conduct.

If the associated seat is occupied, the voltage at terminal T2 will either go high or float, thereby enabling C1 to be charged and causing Q1 to become conductive. The collector of Q1 will now go low, thereby turning off Q2 and Q3. The high voltage which now appears at the collector of Q2 is connected through D2, R7, SW and the collector-emitter junction of Q1 to ground, thereby shunting turn-on current from the base-emitter junction of Q3. Thus, the warning/disabling circuit 40 is actuated. However, once the occupant of the seat fastens his seat belt buckle, switch SW is opened, thereby opening the current path in which it is connected. The high voltage at the collector of Q2 now provides turn-on current through D2 to the base-emitter junction of transistor Q3, which is again rendered conductive. Thus, the warning/disabling circuit 40 is de-actuated. However, if the fastened seat belt buckle is subsequently unfastened, switch SW will again close the current path from the collector of Q2 through Q1 to ground and cause Q3 to be rendered non-conductive, and the warning/disabling circuit 40 will again be actuated.

If the associated seat is unoccupied, with the resultant low signal at terminal T2, and the seat belt buckle is fastened, thereby opening switch SW, the turn-on signal provided to the base of Q3 from the collector of Q1 through switch SW and resistance R7 is removed, and Q3 becomes non-conductive. As a result, the warning/disabling circuit is actuated. Also, the positive voltage at the collector of Q1 is no longer limited by the voltage divider formed by resistances R3, R7 and R8 paralleled by the base-emitter junction of Q3. Thus, zener diode D1 breaks down and current flows through resistance R4. Transistor Q2 is thereby rendered conductive, closing a shunt path to ground for any input to transistor Q1. If the associated seat is then occupied, causing the voltage at terminal T2 to go high, this will have no effect on Q1 because of the conductive condition of Q2. Thus, a seat occupant cannot first fasten his seat belt buckle and wedge it into the crease of the seat and then sit down without actuating the warning/disabling circuit 40.

In the circuit disclosed herein as the preferred embodiment of applicants invention, the various components have the following values:

| Resistances | Transistors |
|---|---|
| R1 — 22K ohms | Q1 — 2N5132 |
| R2 — 2K ohms | Q2 — 2N5132 |
| R3 — 4.7K ohms | Q3 — 2N5132 |
| R4 — 10K ohms | Q4 — 2N5132 |
| R5 — 10K ohms | |
| R6 — 100 K ohms | Diodes |
| R7 — 1K ohm | |
| R8 — 10K ohms | D1 — 5 volt (1N5231) |
| | D2 — 1N4148 |
| Capacitance | |
| C1 — 1 microfarad | |

It should be understood that the disclosed embodiment of the invention may be modified in a number of ways. For example, the components R1, R2 and C1 form what is essentially a coupling circuit between the base of Q1 and the collector of the output transistor of the particular sensor circuit which is the subject matter of the first-mentioned cross-referenced application. That sensor circuit normally provides either a constant high output or a pulsating output, depending upon the level of its input signal. If the signal-sequence control circuit 10 were employed with a sensor circuit 20 which provided constant high or low outputs under the conditions prescribed herein, the coupling circuit formed by R1, R2 and C1 would not be necessary. Therefore, these components are not deemed to form an essential part of applicant's invention. Also, the optionally-included resistance R8 may be eliminated without causing any serious degradation of circuit performance. Its presence merely makes transistor Q3 less likely to be spuriously turned on by leakage current or as a result of variations in the characteristics of transistor Q3. In addition, the warning/disabling circuit 40 may be a two-terminal circuit or device rather than a three-terminal circuit as shown. It may be necessary to modify the load end of the circuit by coupling another transistor stage to Q3 to provide a normally nonconductive load-controlling transistor instead of a normally-conductive transistor such as Q3 is in the disclosed embodiment. Obviously, switch SW would be incorporated in seat belt buckle 30, with lead wires extending therefrom along the seat belt to the remainder of the circuit. Finally, it should be appreciated that the signal-sequence control circuit 10 which embodies the present invention may be utilized in numerous applications other than that which has been set forth herein for the purpose of illustration.

The advantages of the present invention, as well as certain changes and modifications of the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

What is claimed is:

1. A signal-sequence control circuit comprising:
   1. first means operative to receive first and second signals and to produce a first output in the absence of both said first and second signals or after receiving both said first and second signals, said first means being further operative to produce a second output after receiving either said first signal alone or said second signal alone; and
   2. second means operative to prevent said first means from producing said first output whenever said first means has received said second signal before said first signal.

2. A signal-sequence control circuit according to claim 1 wherein said first means comprises:
   1. first transistor means operative to change conductivity state after receiving said first signal;
   2. second transistor means operative to change conductivity state in response to a change in conductivity state of said first transistor means;
   3. connecting means operative to close a current path between output terminals of said first and second transistor means in the absence of said second signal, and further operative to open said current path after receiving said second signal; and
   4. third transistor means connected to said first and second transistor means by said connecting means and operative to produce said first and second outputs.

3. A signal-sequence control circuit according to claim 2 wherein said connecting means comprises a switch, a first resistance, and a diode connected in series between output terminals and said first and second transistor means.

4. A signal-sequence control circuit according to claim 3 wherein the input terminal of said third transistor means is connected to the junction of said diode and said first resistance.

5. A signal-sequence control circuit according to claim 2 wherein the output terminal of said first transistor means is connected through a second resistance to the input terminal of said second transistor means.

6. A signal-sequence control circuit according to claim 2 further comprising a coupling circuit connected to the input terminal of said first transistor means.

7. A signal-sequence control circuit according to claim 2 wherein said second means comprises fourth transistor means operative, after only said second signal has been received by said first circuit means, to shunt any subsequent first signal from the input terminal of said first transistor means.

8. A signal-sequence control circuit according to claim 7 wherein said fourth transistor means includes bias circuit means connected between the output terminals of said first transistor means.

9. A signal-sequence control circuit according to claim 8 wherein said bias circuit means comprises a voltage breakdown device connected in series with a third resistance, the junction thereof being connected to the input terminal of said fourth transistor means.

10. A signal-sequence control circuit according to claim 9 wherein said voltage breakdown device consists of a zener diode.

* * * * *

UNITED STATES PATENT OFFICE
CERTIFICATE OF CORRECTION

Patent No. 3,777,180          Dated December 4, 1973

Inventor(s)    Paul A. Carlson

It is certified that error appears in the above-identified patent and that said Letters Patent are hereby corrected as shown below:

Under References Cited: United States Patent 3,624,522

11/1971 ......... Glosek has been omitted.

Signed and sealed this 16th day of April 1974.

(SEAL)
Attest:

EDWARD M. FLETCHER, JR.
Attesting Officer

C. MARSHALL DANN
Commissioner of Patents